(12) United States Patent
Yamada et al.

(10) Patent No.: US 7,440,133 B2
(45) Date of Patent: *Oct. 21, 2008

(54) MODE SWITCHING IN A COLOR PRINTER

(75) Inventors: Takanobu Yamada, Toyokawa (JP);
Seiichi Munemori, Toyokawa (JP);
Yuusuke Morikami, Toyohashi (JP)

(73) Assignee: Minolta Co., Ltd., Osaka-shi (JP)

( * ) Notice: Subject to any disclaimer, the term of this patent is extended or adjusted under 35 U.S.C. 154(b) by 739 days.

This patent is subject to a terminal disclaimer.

(21) Appl. No.: 10/217,545

(22) Filed: Aug. 14, 2002

(65) Prior Publication Data

US 2003/0038955 A1 Feb. 27, 2003

(30) Foreign Application Priority Data

Aug. 21, 2001 (JP) .............................. 2001-250325

(51) Int. Cl.
*B41J 1/00* (2006.01)
*G06F 15/00* (2006.01)
*H04N 1/40* (2006.01)
*G03G 15/22* (2006.01)

(52) U.S. Cl. .................. 358/1.9; 358/1.13; 358/2.1; 399/45; 399/48; 399/130; 399/408

(58) Field of Classification Search ................ 358/1.13, 358/1.9, 2.1; 399/82, 85, 69, 70, 223, 54, 399/66, 71, 301, 48, 130, 302, 162, 167, 399/45, 50, 308; 725/9

See application file for complete search history.

(56) References Cited

U.S. PATENT DOCUMENTS

| | | | | |
|---|---|---|---|---|
| 5,319,428 A | * | 6/1994 | Maruko et al. | 399/70 |
| 5,619,308 A | * | 4/1997 | Kinoshita et al. | 399/48 |
| 5,729,789 A | * | 3/1998 | Tamaki | 399/70 |
| 5,790,930 A | * | 8/1998 | Fuchiwaki | 399/302 |
| 5,828,926 A | * | 10/1998 | Iwata et al. | 399/66 |
| 5,999,760 A | * | 12/1999 | Suzuki et al. | 399/45 |
| 6,061,542 A | * | 5/2000 | Minami et al. | 399/299 |
| 6,240,264 B1 | * | 5/2001 | Yajima et al. | 399/82 |
| 6,324,374 B1 | * | 11/2001 | Sasamoto et al. | 399/298 |
| 6,360,071 B1 | * | 3/2002 | Tomizawa | 399/302 |
| 6,636,711 B1 | * | 10/2003 | Katahira | 399/82 |
| 6,847,470 B2 | * | 1/2005 | Nishiwaki | 358/1.9 |
| 2004/0025175 A1 | * | 2/2004 | Tamekuni et al. | 725/9 |

FOREIGN PATENT DOCUMENTS

| | | |
|---|---|---|
| JP | 11-065315 | 3/1999 |
| JP | 11-73035 | 3/1999 |
| JP | 2000-39816 | 2/2000 |

OTHER PUBLICATIONS

English translation of Japanese Office Action dated Jan. 25, 2005.

* cited by examiner

*Primary Examiner*—Edward L. Coles
*Assistant Examiner*—Charlotte M Baker
(74) *Attorney, Agent, or Firm*—Morrison & Foerster LLP

(57) ABSTRACT

A tandem-type color image forming apparatus forms an image in a monochrome mode or in a full color mode. The apparatus has a controller which delays an image forming operation for a predetermined period of time when a color mode is switched from the monochrome mode to the full color mode during different images are continuously formed.

17 Claims, 8 Drawing Sheets

MODE SWITCHING IN A COLOR PRINTER

This application is based on Japanese Patent Application No. 2001-250325 filed in Japan on Aug. 21, 2001, the entire content of which is hereby incorporated by reference.

BACKGROUND OF THE INVENTION

1. Field of the Invention

The present invention relates to a so-called tandem-type color image forming apparatus.

2. Description of Related Art

So-called tandem-type color image forming apparatuses, in which multiple image forming units housing toners of different colors are aligned along an intermediate transfer belt, are known in the conventional art. In an image forming apparatus of this type, images of different colors formed by the respective image forming units are transferred onto the intermediate transfer belt in a primary transfer operation such that they overlap each other, and these overlapping images undergo a secondary transfer operation as one unit from the intermediate transfer belt to a sheet of paper. The sheet of paper is heated such that the images bond thereto while it passes through the fusing unit, and is ejected to the eject tray.

The color image forming apparatus is also equipped with multiple color modes, including full color mode in which image formation is performed u sing color toners, and monochrome mode with which image formation is performed using black toner only. When the full color mode is activated, the color image forming apparatus forms color images by placing the image forming units of all colors in contact with the intermediate transfer belt. When the monochrome mode is activated, it performs formation of monochrome images by placing only the black image forming unit in contact with the intermediate transfer belt.

In the tandem-type color image forming apparatus described above, the status of contact between the intermediate transfer belt and each image forming unit must therefore be altered depending on the activated color mode. Where a color image and a monochrome image are printed on a continuous basis, if the next image forming operation is begun while the contact status between the intermediate transfer belt and the image forming units is still being changed or immediately after such change is conducted, poor image quality may result due to the vibration or snaking of the intermediate transfer belt.

However, if the next image forming operation is begun only after the vibration or snaking of the intermediate transfer belt caused by the mode switching operation has been completely stopped, productivity is greatly reduced.

OBJECTS AND SUMMARY

An object of the present invention is to provide a color image forming apparatus that maintains high image quality even where a color image and a monochrome image are printed on a continuous basis.

Furthermore, another object of the present invention is to provide a color image forming apparatus that maintains high productivity even where a color image and a monochrome image are printed on a continuous basis.

These objects are attained by providing a tandem-type color image forming apparatus, comprising an image forming device which forms an image in a mono-color mode or in a multi-color mode, and a controller which delays an image forming operation carried out by the image forming device for a predetermined period of time when a color mode is switched from the mono-color mode to the multi-color mode during different images are continuously formed. Similarly, the controller can control a length of time from a color mode switching operation to a next image forming operation carried out by the image forming device, wherein the length of time when a color mode is switched from the multi-color mode to the mono-color mode is shorter than the length of time when the color mode is switched from the mono-color mode to the multi-color mode.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

An embodiment of the present invention is described below with reference to the accompanying drawings.

Figure 1:
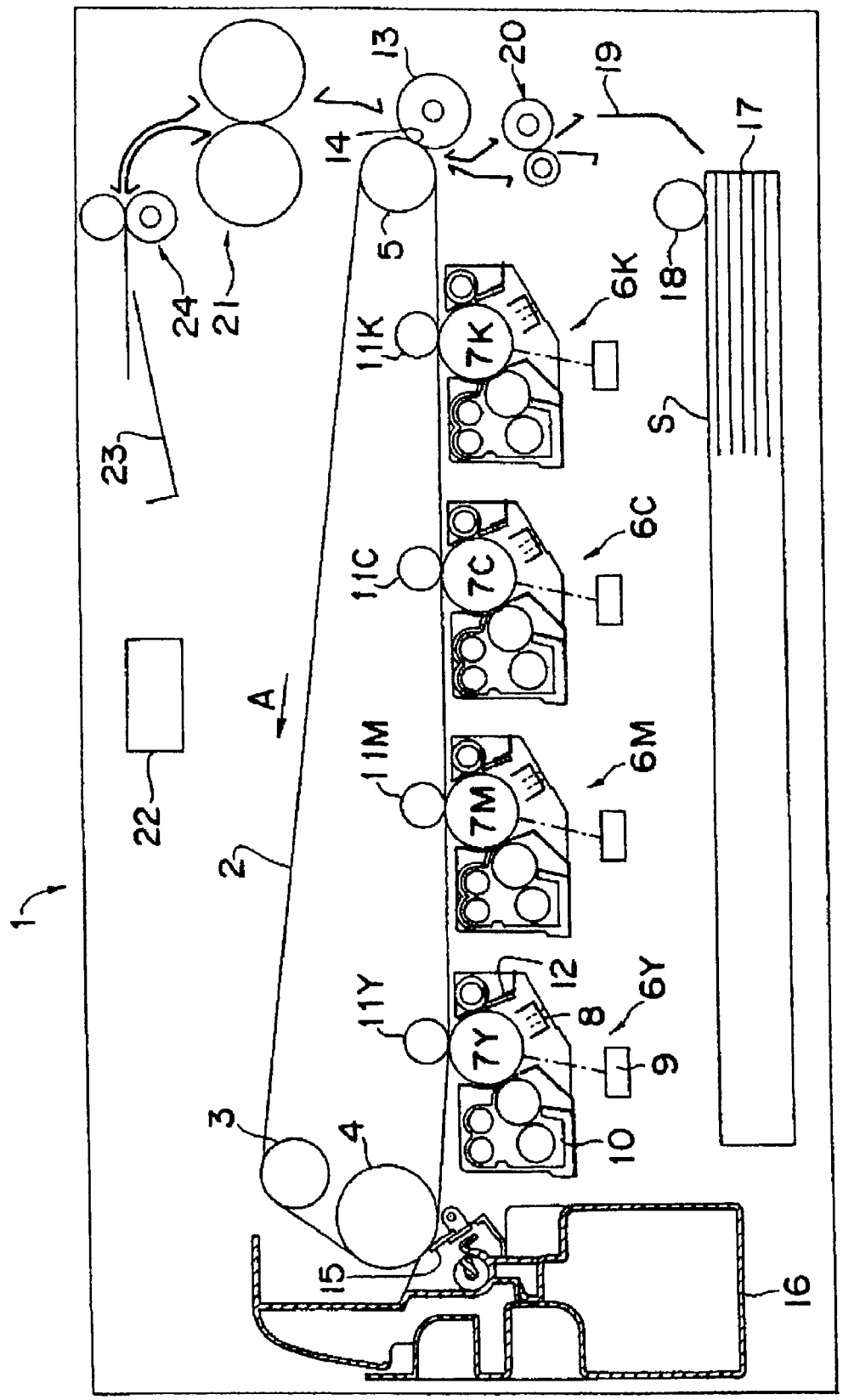
FIG. 1 is a basic construction drawing showing the printer pertaining to an embodiment of the present invention.

FIG. 1 shows the construction of the entire tandem-type digital color printer (hereinafter simply 'printer') 1, that comprises one embodiment of the present invention.

The printer 1 includes an intermediate transfer belt 2, which comprises a transfer unit, located essentially at the center of the interior thereof. The intermediate transfer belt 2 is supported by the outer circumferences of three rollers 3, 4 and 5 such that it is driven to rotate in the direction of the arrow A. The roller 3 is a tension roller that provides tension to the intermediate transfer belt 2. The roller 5 is linked to a drive motor not shown in the drawing, and as the roller 5 rotates, the rollers 3 and 4 are also rotated.

Under the lower horizontal part of the intermediate transfer belt 2 are arranged four image forming units 6Y, 6M, 6C and 6K such that they are aligned along the intermediate transfer belt 2, such image forming units respectively corresponding to the colors yellow (Y), magenta (M), cyan (C) and black (K).

The image forming units 6Y, 6M, 6C and 6K have photoreceptor drums (image carriers) 7Y, 7M, 7C and 7K, respectively. Around each photoreceptor drum 7Y, 7M, 7C and 7K are sequentially arranged in the direction of the rotation thereof a charger 8, a printer head 9, a developing device 10, primary transfer rollers 11Y, 11M, 11C and 11K that face via the intermediate transfer belt 2 each photoreceptor drum 7Y, 7M, 7C and 7K, respectively, and a cleaner 12.

A secondary transfer roller 13 is in pressure contact with the intermediate transfer belt 2 at an area thereof that is supported by the roller 5. The nipping area between the secondary transfer roller 13 and the intermediate transfer belt 2 comprises a secondary transfer area 14.

A belt cleaner 15, which scrapes off the toner remaining on the intermediate transfer belt 2 after the secondary transfer operation and collects such toner into a discard toner box 16, is in pressure contact with the intermediate transfer belt 2 at an area thereof that is supported by the roller 4.

A paper supply cassette 17 is detachably located at the bottom part of the printer 1. The sheets of paper S that are stacked and housed in the paper supply cassette 17 are sent out to the conveyance path 19 one by one starting with the topmost sheet via the rotation of the paper supply roller 18.

The conveyance path 19 extends from the paper supply cassette 17 to the eject tray 23 via the nipping area of the timing roller pair 20, the secondary transfer area 14, the fusing roller 21 and the eject roller 24.

Figure 2:
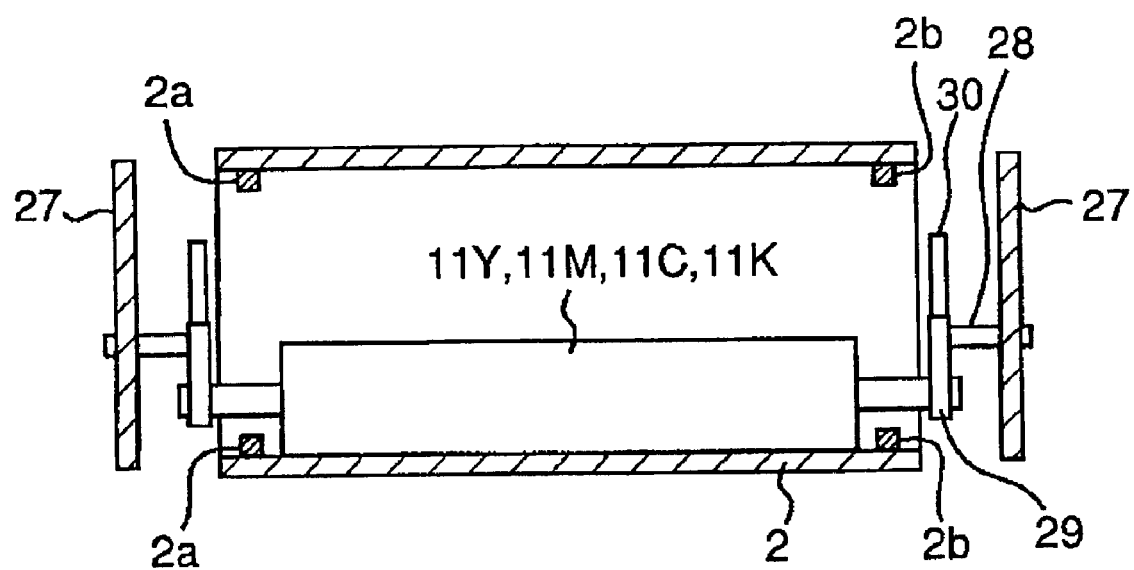
FIG. 2 is a drawing showing the protrusions on the inner surface of the intermediate transfer belt that are used to reduce the shaking thereof.
Figure 3:
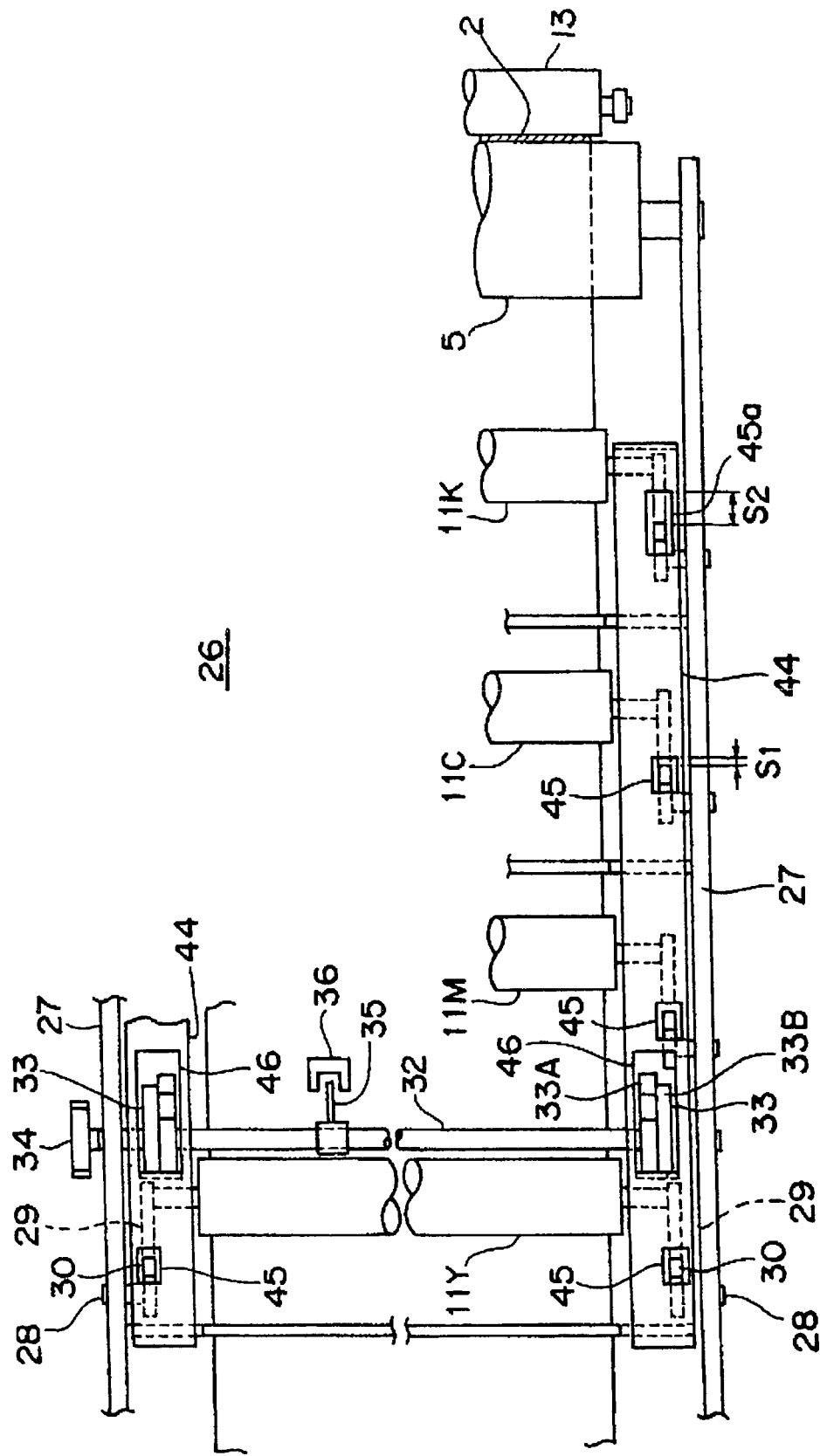
FIG. 3 is a partial plan view of the intermediate transfer belt unit.
Figure 4:
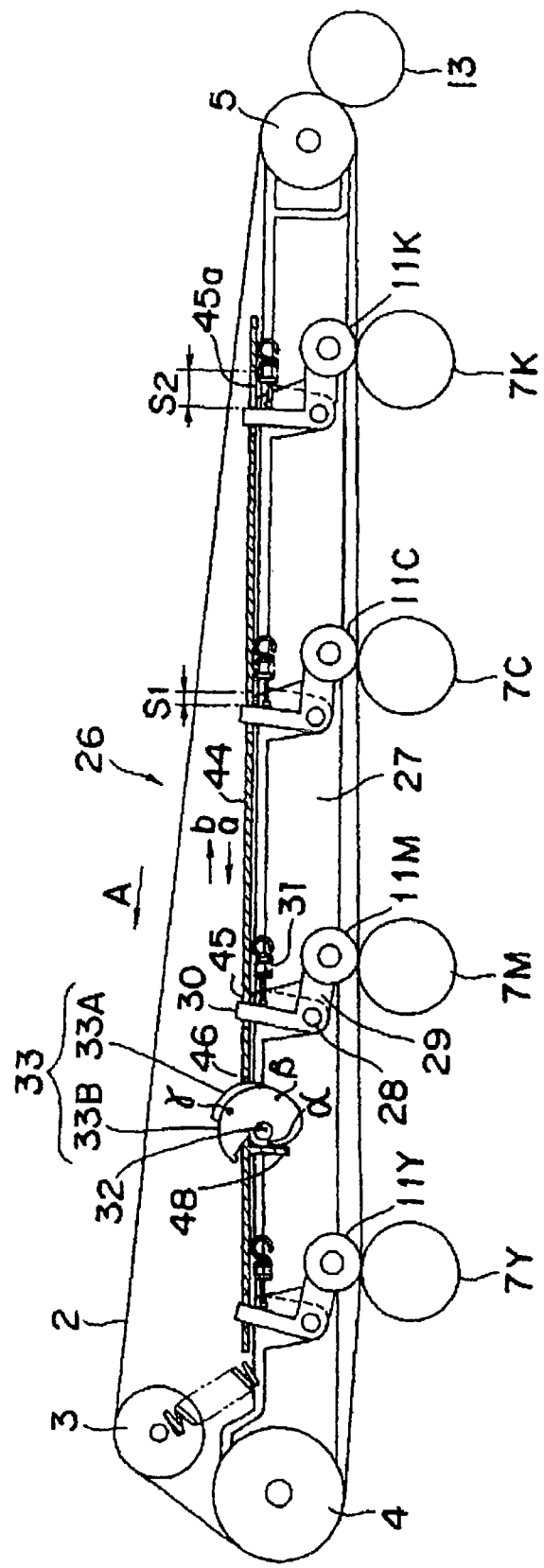
FIG. 4 is a front elevation of the intermediate transfer belt unit when full color mode is activated.

To explain the intermediate transfer belt 2 in more detail, the three rollers 3, 4 and 5 that support the intermediate transfer belt 2 are rotatably supported at both ends thereof by the frames 27, as shown in FIGS. 3 and 4, and these components together comprise an intermediate transfer belt unit 26. Inside the intermediate transfer belt 2 are located primary transfer rollers 11Y, 11M, 11C and 11K. Protruding bands 2a and 2b, which are formed of rubber, for example, and are formed in a continuous fashion near either end of the primary transfer rollers 11Y, 11M, 11C and 11K, are integrally formed on the inner surface of the intermediate transfer belt 2, as shown in FIG. 2. When the protruding bands 2a and 2b come into contact with the end surfaces of the primary transfer rollers 11Y, 11M, 11C and 11K, the snaking of the intermediate transfer belt 2 is reduced, enabling stable belt operation.

These primary transfer rollers 11Y, 11M, 11C and 11K each have switching means as described below. The primary transfer rollers 11Y, 11M, 11C and 11K are each rotatably supported at the tips of the arms 29 that are rotatably supported by shafts 28 to both frames 27, as shown in FIGS. 3 and 4. A lever 30 is located on each arm 29 near the shaft 28. A spring 31 is mounted between each lever 30 and the frame 27, such that the arms 29 are pushed counterclockwise in FIG. 4 to push down the primary transfer rollers 11Y, 11M, 11C and 11K, thereby achieving a first state, in which the intermediate transfer belt 2 are in pressure contract with the photoreceptor drums 7Y, 7M, 7C and 7K.

In addition, while described in more detail below, in a second state, the intermediate transfer belt 2 is in contact with the photoreceptor drum 7K only, and in a third state, all of the photoreceptor drums 7Y, 7M, 7C and 7K are retracted from the intermediate transfer belt 2. The first state is the state present during color image formation, the second state is the state present during monochrome image formation, and the third state is the state present when no image formation is taking place.

A cam shaft 32 is located between the primary transfer rollers 11Y and 11M while being supported by both frames 27, and cams 33 are fixed near either end of the cam shaft 32. The cam shaft 32 protrudes outside one of the frames 27, as shown in FIG. 3, and a gear 34 is fixed to the end thereof. This gear 34 engages with and is driven to rotate by a drive gear that is not shown and is linked to a pulse motor, which is also not shown. Each cam 33 has two cam surfaces 33A and 33B. A home position detection plate 35 is fixed to the cam shaft 32. When this detection plate 35 is detected by a sensor 36, the rotational position of the cam shaft 32 and the cams 33 is detected, and based on this detection result, it is detected whether the primary transfer rollers 11Y, 11M, 11C and 11K are in the first, second or third state, and by controlling the number of rotations of the pulse motor, switching among the first, second and third states can be made.

A slide plate 44 is slidably located on each frame 27. Rectangular holes 45 into which the upper ends of the levers 30 of the primary transfer rollers 11Y, 11M, 11C and 11K are inserted, and an opening 46 into which one end of the cam 33 is inserted, are formed in each slide plate 44. The distance S1 from the upper end of each lever 30 of the primary transfer rollers 11Y, 11M and 11C that are in pressure contact with the photoreceptor drums 7Y, 7M and 7C to the right edge in FIG. 3 of each hole 45 of the slide plate 44 into which these levers 30 are inserted is set to be smaller than the distance S2 from the upper end of the lever 30 of the primary transfer roller 11K that is in pressure contact with the photoreceptor drum 11K and the right edge in FIG. 3 of the hole 45a of the sliding plate 44 into which the lever 30 is inserted. A protrusion 48 with which the cam surface 33A of each cam 33 comes into contact is formed at the left edge of each opening 46 in FIG. 3 such that it extends downward. Through this construction, when rotating clockwise, the cam surfaces 33A of the cams 33 press against the protrusions 48 and move the slide plates 44 leftward in the FIG. 4 (the direction of the arrow (a)), and when the cams 33 rotate counterclockwise, as the levers 30 rotate clockwise by the force of the springs 31, the slide plates 44 move rightward in FIG. 4 (the direction of the arrow (b)).

Figure 5:
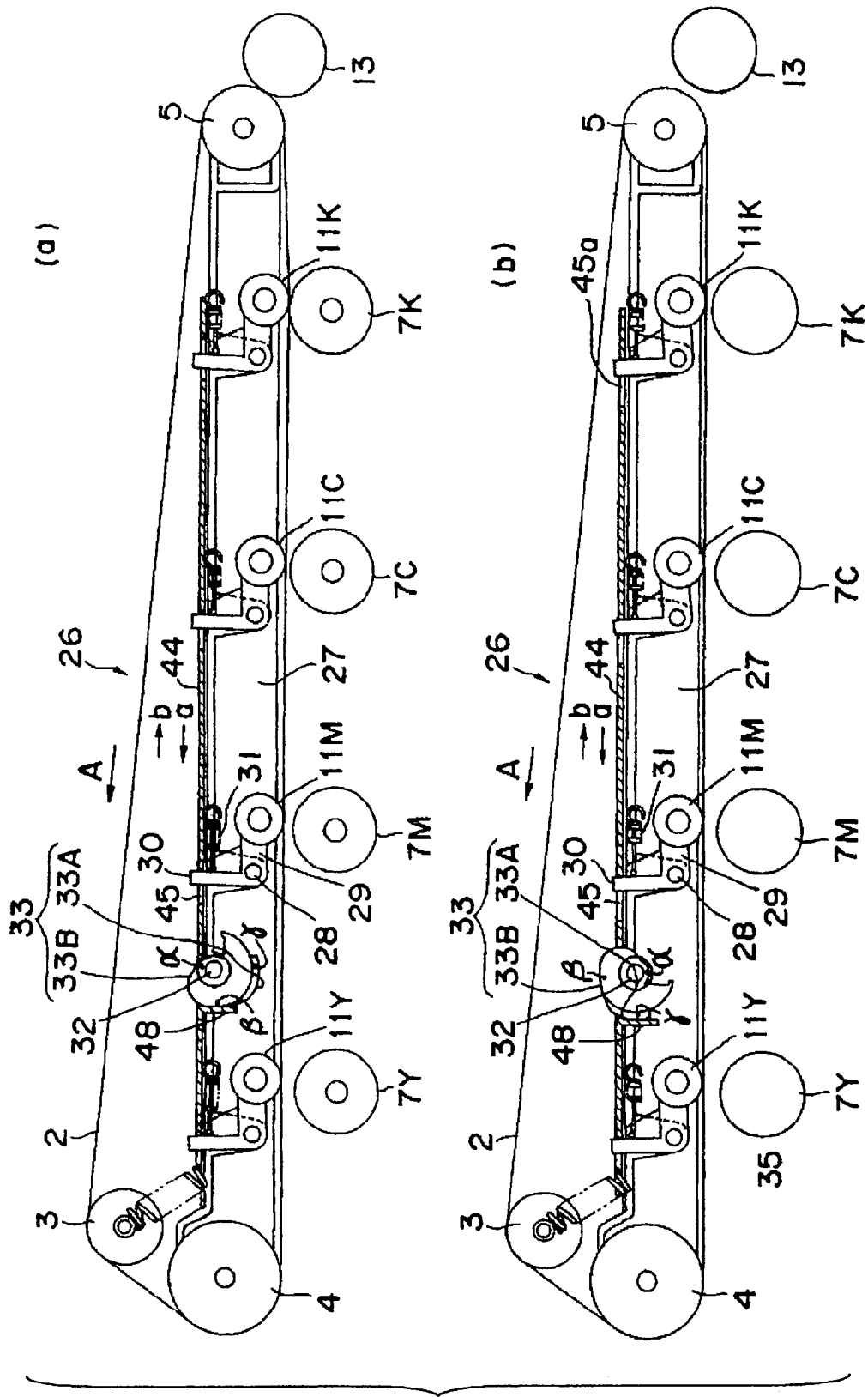
FIG. 5 comprises front elevations of the intermediate transfer belt unit when (a) monochrome mode is activated and (b) no images are being formed.

When the primary transfer rollers 11Y, 11M, 11C and 11K are in the third state in which they are all retracted from the photoreceptor drums 7Y, 7M, 7C and 7K, as shown in FIG. 5(b), the intermediate transfer belt 2 is not in contact with the photoreceptor drums 7Y, 7M, 7C and 7K, and is angled relative to the plane with which the outer circumferences of the photoreceptor drums 7Y, 7M, 7C and 7K are in contact. The distance between the intermediate transfer belt 2 and the photoreceptor drum 7K to which the intermediate transfer belt 2 comes the closest is set at a constant level taking into account the sag of the intermediate transfer belt 2 and the drop of the primary transfer roller 11K due to gravity.

The printer 1 also has a controller 22, as shown in FIG. 1. The controller 22 performs switching regarding the contact state of the primary transfer rollers 11Y, 11M, 11C and 11K as well as control of the image forming operation, as described below.

The printer 1 includes multiple color modes such as a full color mode in which image formation is performed using color toners, and a monochrome mode in which image formation is performed using black toner only. A color mode is selected manually by the user via an operation panel not shown, or automatically via the ACS (auto-color select) function with which the color image forming apparatus is equipped. The ACS function is a function that analyzes the image signals when they are input and automatically selects the appropriate color mode for the image.

The basic operation of the printer 1 having the construction described above will now be explained.

The color image forming operation will first be explained. When image signals are input from an external device (such as a personal computer) to the image signal processor (not shown) of the printer 1, the image signal processor generates digital image signals by performing color conversion of the original image signals into signals for yellow, cyan, magenta and black, and these digital image signals are sent to the print head LED drive circuit. Based on the input digital signals, the drive circuit causes the print heads 9 of the image forming units 6Y, 6M, 6C and 6K to perform exposure. Electrostatic latent images for each color are consequently formed on the surfaces of the photoreceptor drums 7Y, 7M, 7C and 7K, respectively. The electrostatic latent images formed on the photoreceptor drums 7Y, 7M, 7C and 7K are developed by each developing device 10 and become toner images of each color.

During color image formation, as shown in FIG. 4, the cam surfaces 33A of each cam 33 are in contact with the protrusions 48 of the slide plates 44 at the position α. Consequently, the arms 29 rotate clockwise due to the force applied by the springs 31, whereby the primary transfer rollers 11Y, 11M, 11C and 11K are maintained in the first state in which they are in pressure contact with the photoreceptor drums 7Y, 7M, 7C and 7K, respectively, via the intermediate transfer belt 2. The toner images of each color formed on the photoreceptor drums 7Y, 7M, 7C and 7K, respectively, sequentially undergo primary transfer operation onto the intermediate transfer belt 2 moving in the direction of the arrow A, such that they overlap on each other, based on the operation of each primary transfer roller 11Y, 11M, 11C and 11K.

The overlapped toner images formed on the intermediate transfer belt 2 in this way reach the secondary transfer area 14 as the intermediate transfer belt 2 moves. At the secondary transfer area 14, the overlapped toner images of each color simultaneously undergo secondary transfer onto the sheet of paper S supplied from the paper supply cassette 17 onto the conveyance path 19 by the timing roller pair 20 based on the operation of the secondary transfer roller 13. The toner that remains on the intermediate transfer belt 2 after the secondary transfer operation is collected by the belt cleaner 15.

The sheet of paper S on which the toner images have been transferred during the secondary transfer operation is sent to the fusing roller 21 via the conveyance path 19, whereat the toner images are fused onto the sheet of paper S. The sheet of paper S is then ejected onto the eject tray 23 via the eject roller 24.

The monochrome image forming operation will now be explained. During monochrome image formation, as shown in FIG. 5(a), the cam surfaces 33A of each cam 33 rotate clockwise until they come into contact with the protrusions 48 of the slide plates 44 at the position β. The slide plates 44 are then pushed by the cams 33 and move in the direction of the arrow (a), whereby the edges of the holes 45 of each slide plate 44 push the levers 30 of the primary transfer rollers 11Y, 11M and 11C. Consequently, the arms 29 rotate counter-clockwise against the force of the springs 31. As a result, the primary transfer rollers 11Y, 11M and 11C move upward and come away from the photoreceptor drums 7Y, 7M and 7C. At the same time, because the edges of the holes 45a of each slide plate 44 do not push the levers 30 of the primary transfer roller 11K, the primary transfer roller 11K stays in pressure contact with the photoreceptor drum 7K via the intermediate transfer belt 2. As a result, the intermediate transfer belt 2 separates from the photoreceptor drums 7Y, 7M and 7C, which are not involved in monochrome image formation, and the second state in which the intermediate transfer belt 2 is in contact with only the photoreceptor drum 7K results.

With this state being present, a black image is formed on the photoreceptor drum 7K by the image forming unit 6K based on the monochrome image signals input into the printer 1. The black image is then transferred on the intermediate transfer belt 2 from the photoreceptor drum 7K during the primary transfer operation, and then onto the sheet of paper S from the intermediate transfer belt 2 during the secondary transfer operation. The sheet of paper S is ejected onto the eject tray 23 via the fusing roller 21, whereupon the formation of a monochrome image is completed.

Figure 6:
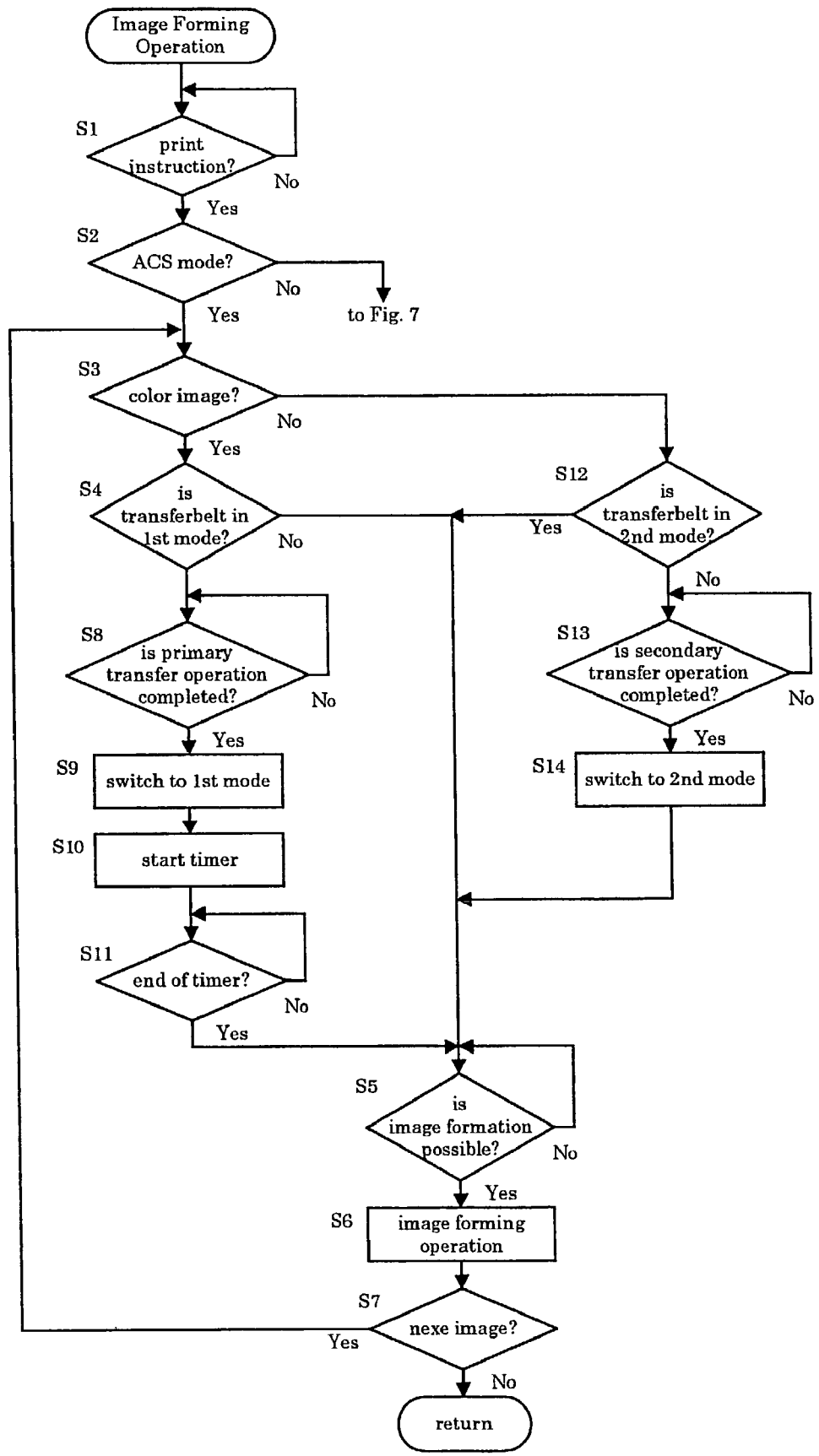
FIG. 6 is a flow chart showing the control by the controller.
Figure 7:
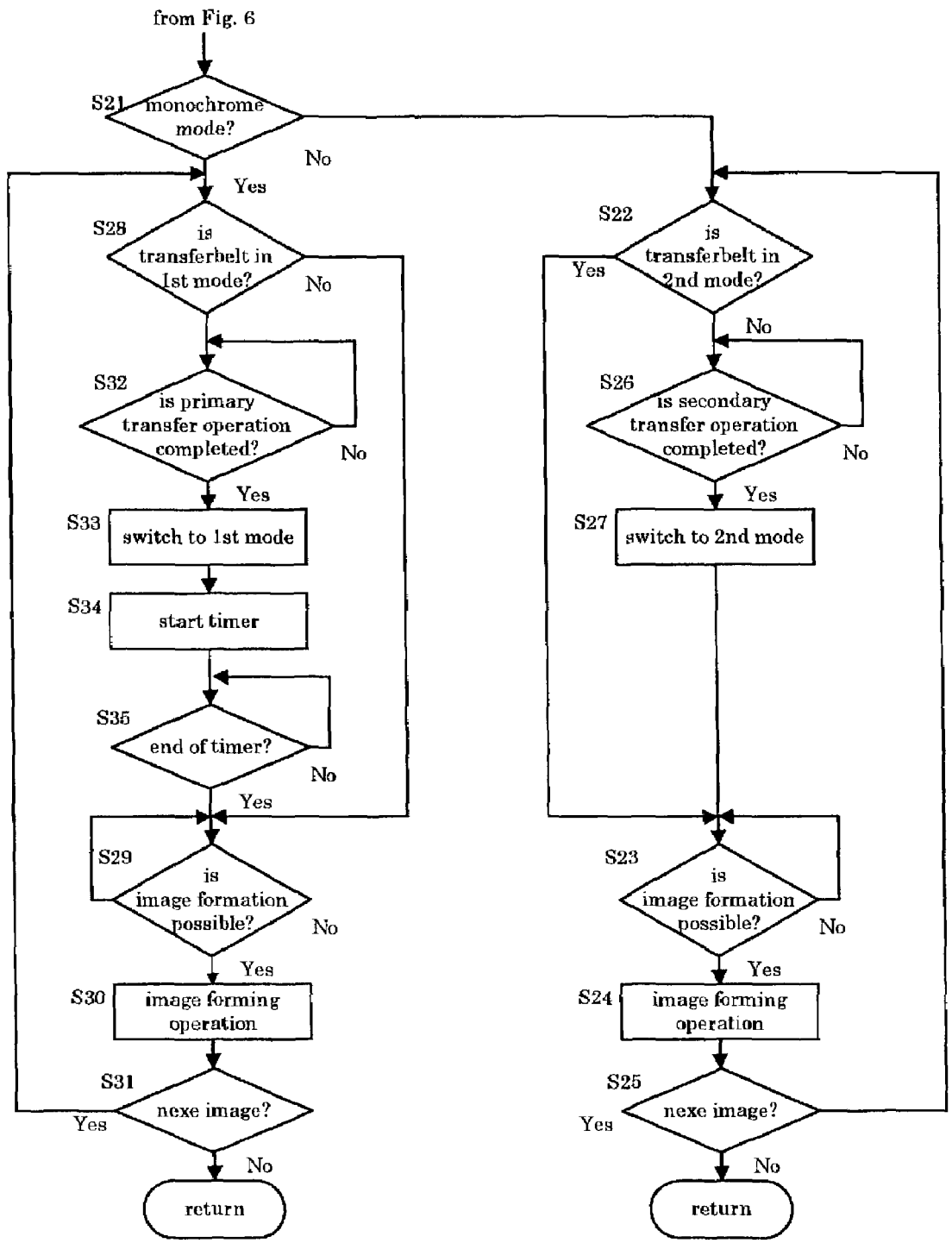
FIG. 7 is a flow chart showing the control by the controller.
Figure 8:
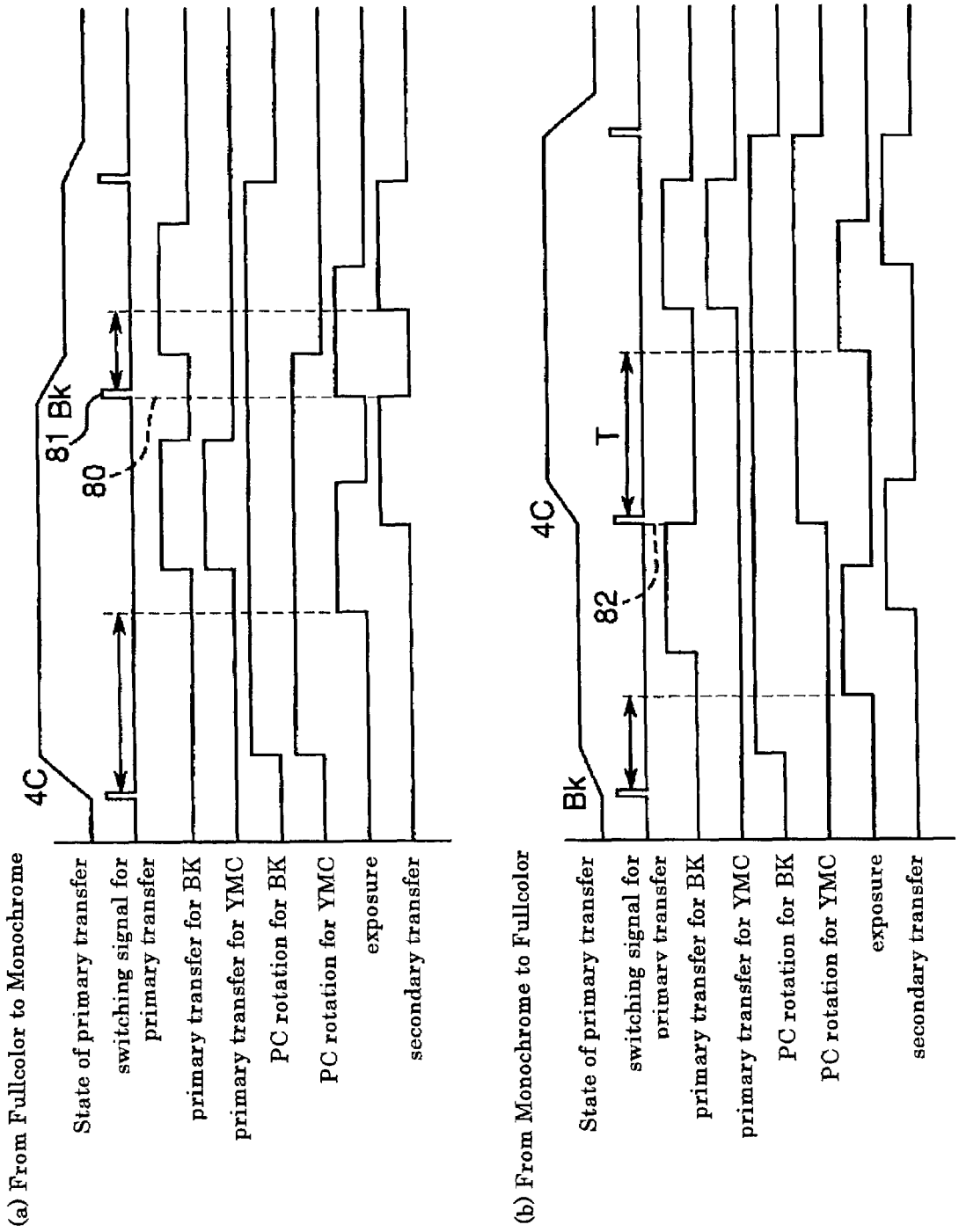
FIG. 8 comprises timing charts regarding various components, showing (a) the switching from full color mode to monochrome mode, and (b) the switching from monochrome mode to full color mode.

The switching from the color image formation state to the monochrome image formation state and the switching in the opposite direction during continuous image formation will now be explained with reference to FIGS. 6 through 8. FIGS. 6 and 7 show the control sequence of the controller 22, FIG. 8(a) shows the operation timings for the various components when the state is switched from the color image formation state to the monochrome image formation state, and FIG. 8(b) shows the operation timings for the various components when the state is switched from the monochrome image formation state to the color image formation state.

An explanation will be first provided with reference to the flow chart of FIG. 6. The controller 22 waits for a print instruction (step S1), and determines whether the ACS mode is activated (step S2). If the ACS mode is activated, it determines whether the input image is a color image or a monochrome image by analyzing the input image signals (step S3).

Where it is determined that the input image is a color image, the controller 22 determines whether or not the intermediate transfer belt 2 is in the first state in which it is in contact with all of the photoreceptor drums 7Y, 7M, 7C and 7K (step S4). Where it is determined that the intermediate transfer drum 2 is in the first state, the controller 22 waits for image formation to be enabled (step S5) and causes the color image forming operation to be performed (step S6). The controller 22 then determines whether or not there is a next image to form (step S7), and if there is, it returns to step S3, and if not, it ends the control sequence.

Where it is determined in the previous step S4 that the intermediate transfer belt 2 is not in the first state (i.e., the intermediate transfer belt 2 is in the second state in which it is in contact with the photoreceptor drum 7K only or in the third state in which it is not in contact with any of the photoreceptor drums 7Y, 7M, 7C or 7K), because it is possible that a monochrome image has previously been formed, the controller 22 determines whether or not the primary transfer operation of that monochrome image has been completed (step S8).

As shown by the dotted line 82 in FIG. 8(b), immediately after the primary transfer operation of the monochrome image is completed, the controller 22 switches the image formation state to the first state (step S9). This switching takes approximately one second to complete. The intermediate transfer belt 2 vibrates as a result of this switching, but because no offsetting of images of different colors occurs and the amount of adhering toner is small with regard to the monochrome image previously formed, no image noise occurs in the secondary transfer operation.

It is possible to perform the switching to the first state prior to the completion of the primary transfer operation of the monochrome image. However, while productivity increases in this case, because the period of time in which the consumable components for color image formation (such as the photoreceptor drums 7Y, 7M and 7C) operate for no purpose increases and the lives of these components are shortened accordingly, such switching is not desirable.

A three-second timer, for example, is started at the same time as the commencement of the switching to the first state (step S10). The controller 22 waits for the timer to run (step S11), and after determining whether or not image formation can be performed (step S5), it causes a color image forming operation to be performed (step S6), and determines whether or not there is a next image to form (step S7).

Due to the timer described above, the commencement of the color image forming operation is delayed by two seconds after the completion of the switching to the first state. Because the vibrations and snaking of the intermediate transfer belt 2 caused by the switching decline during this delay period, color images can be formed on the intermediate transfer belt 2 in a stable fashion, and a high-quality image with no image noise such as color shift can be obtained.

Where the image is determined to be a monochrome image in step S3, the controller 22 determines whether or not the second state in which the intermediate transfer belt 2 is in contact with the photoreceptor drum 7K only is present (step S12). Where the second state is present, formation of a monochrome image takes place (steps S5, S6, S7). On the other hand, where the second state is not present (i.e., where the first state in which the intermediate transfer bet 2 is in contact with all of the photoreceptor drums 7Y, 7M, 7C and 7K or the third state in which the intermediate transfer belt 2 is not in contact with any of the photoreceptor drums 7Y, 7M, 7C or 7K is present), because it is possible that a color image has previously been formed, it is determined whether or not the secondary transfer operation of that color image has been finished (step S13), and the controller 22 switches the image formation state to the second state upon the completion of the secondary transfer operation (step S14). Specifically, as shown by the dotted line 80 in FIG. 8(a), the controller 22 causes a switching signal 81 that instructs switching to the second state to be generated at the same time that the secondary transfer output is turned off. As described above, because the switching to the second state for monochrome image formation is performed after the completion of secondary transfer operation of the previous color image, the vibrations of the intermediate transfer belt 2 that occur together with the switching operation do not affect the secondary transfer operation of the previous color image, and a high-quality color image that does not suffer from image noise such as color shift can be obtained.

Subsequently, a monochrome image is formed after the intermediate transfer belt 2 is switched to the second state in the manner described above (steps S5, S6, S7), and when this is done, a monochrome image forming operation is begun at the same time as the switching to the second state is performed. More specifically, as shown by the dotted line 80 in FIG. 8(a), exposure in the image forming unit 6K is begun at the same time that (or immediately before or after) the switching signal 81 is generated. In this case, even if the intermediate transfer belt 2 vibrates slightly due to the switching operation, if the image to be formed is a monochrome image, image noise such as color shift does not occur during the primary transfer operation, and by beginning an image forming operation early in this way, productivity can be increased.

In addition, in the control by the controller 22 described above, the period of time between the switching from the first state to the second state and the commencement of the monochrome image forming operation (i.e., the commencement of exposure of the photoreceptor drum 7K) is set to be shorter than the period of time between the switching to the first state from the second state and the commencement of the next color image forming operation (i.e., the commencement of exposure of the photoreceptor drums 7Y, 7M, 7C and 7K). Specifically, as shown by the dotted line 80 in FIG. 8(a), while the time difference between the generation of the switching signal 81, which indicates switching from the first state to the second state, and the commencement of exposure for a monochrome image is essentially zero because they take place essentially at the same time, as shown in FIG. 8(b), in order to wait for the attenuation of the vibrations of the intermediate transfer belt 2 as described above, the time T between the switching to the first state from the second state and the commencement of exposure for a color image is set to be three seconds, for example, using a timer. By setting the period of time required for monochrome image formation to be shorter in this way when a monochrome image and a color image are formed on a continuous basis, productivity can be improved.

The flow chart of FIG. 7, which is essentially identical to FIG. 6, will now be explained. Where it is determined in step S2 that the ACS mode is not activated, the controller 22 determines whether or not the monochrome mode is activated (step S21). Where the monochrome mode is activated, the controller 22 determines whether or not the second state is present (step S22). Where the second state is present, the controller 22 waits for image formation to be enabled (step S23), and causes a monochrome image forming operation to be performed (step S24). It then determines whether there is another image to form (step S25), and if there is, it returns to step S22, and if not, it ends the control sequence. On the other hand, where the controller 22 determines that the second state is not present in step S22, because it is possible that a color image has previously been formed, the controller 22 determines whether or not the secondary transfer operation of that color image has been completed (step S26), switches the image formation state to the second state upon the completion thereof (step S27), and causes a monochrome image to be formed (steps S23, S24, S25).

Where it is determined in step S21 that the full color mode is activated, the controller 22 determines whether or not the image formation state is the first state (step S28). Where it is determined that the image formation state is the first state, the controller 22 waits for image formation to be enabled (step S29), and causes a color image forming operation to be performed (step S30). The controller 22 then determines whether or not there is another image to form (step S31), and if there is, it returns to step S28, and if not, it ends the control sequence.

Where it is determined in step S28 that the image formation state is not the first state, because it is possible that a monochrome image has previously been formed, the controller 22 determines whether or not the primary transfer operation of that monochrome image has been finished (step S32). Subsequently, as shown by the dotted line 82 in FIG. 8(b), the controller 22 switches the image formation state to the first state immediately after the primary transfer operation of the monochrome image is completed (step S33).

The controller 22 begins the timer simultaneously with the commencement of the switching to the first state (step S34). It waits for the timer to run (step S35), and determines whether or not image formation is enabled (step S29), whereupon it causes a color image forming operation to be performed (step S30), and determines whether or not there is a next image to form (step S31).

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

For example, in the above embodiment, an apparatus that transfers the toner images onto the intermediate transfer belt 2 in a primary transfer operation and then onto a sheet of paper in a secondary transfer operation was described, but the present invention is not limited to this implementation, and can be applied in an apparatus that directly transfers the toner images onto the sheet of paper (transfer medium) that is conveyed on the sheet conveyance belt having a similar construction as the intermediate transfer belt as well.

Furthermore, while a printer was described as an example in the above embodiment, the present invention is not limited to this implementation, and can be applied in a digital copying machine or a multi-function peripheral device.

What is claimed is:

1. A tandem-type color image forming apparatus, comprising:
   an image forming device which forms an image in a mono-color mode or in a multi-color mode;
   a timer for counting a predetermined period of time; and
   a controller which delays an image forming operation carried out by the image forming device for the predetermined period of time counted by the timer when a color mode is switched from the mono-color mode to the multi-color mode while different images are continuously formed,
   wherein when a color mode is switched from the multi-color mode to the mono-color mode while different images are continuously formed, the controller makes the image forming device start the image forming operation at the approximate same time as switching to the mono-color mode.

2. A tandem-type color image forming apparatus as claimed in claim 1, wherein the mono-color mode is a monochrome mode and the multi-color mode is a full color mode.

3. A tandem-type color image forming apparatus as claimed in claim 1, wherein the controller judges the color mode automatically based on an image data signal to be printed and switches the color mode if necessary.

4. A tandem-type color image forming apparatus as claimed in claim 1, wherein the image forming device comprises a intermediate transfer belt and a plurality of photoreceptor drums aligned along the intermediate transfer belt, and wherein one of the photoreceptor drum contacts with the intermediate transfer belt in the mono-color mode and all of the photoreceptor drums contacts with the intermediate transfer belt in the multi-color mode.

5. A tandem-type color image forming apparatus as claimed in claim 4, wherein the photoreceptor drums transfer their images to the intermediate transfer belt as a primary transfer operation and the intermediate transfer belt transfers its image to a sheet of paper as a secondary transfer operation, and wherein the switching operation from the mono-color mode to the multi-color mode is carried out after the primary transfer operation for a previous image.

6. A tandem-type color image forming apparatus, comprising:
   an image forming device which forms an image in a mono-color mode or in a multi-color mode;
   a timer for counting a time period, the time period being a predetermined value; and
   a controller which controls a length of time by use of the timer from a color mode switching operation to a next image forming operation carried out by the image forming device, wherein
   the length of time when a color mode is switched from the multi-color mode to the mono-color mode is shorter than the length of time when the color mode is switched from the mono-color mode to the multi-color mode, and
   when a color mode is switched from the multi-color mode to the mono-color mode while different images are continuously formed, the controller makes the image forming device start the image forming operation at the approximate same time as the start of switching to the mono-color mode.

7. A tandem-type color image forming apparatus as claimed in claim 6, wherein the controller judges the color mode automatically based on an image data signal to be printed and switches the color mode if necessary.

8. A tandem-type color image forming apparatus as claimed in claim 6, wherein the mono-color mode is a monochrome mode and the multi-color mode is a full color mode.

9. A tandem-type color image forming apparatus as claimed in claim 6, wherein the controller delays the image forming operation for a predetermined period of time when switching from the mono-color mode to the multi-color mode.

10. A tandem-type color image forming apparatus as claimed in claim 6, wherein the image forming device comprises a intermediate transfer belt and a plurality of photoreceptor drums aligned along the intermediate transfer belt, and wherein one of the photoreceptor drum contacts with the intermediate transfer belt in the mono-color mode and all of the photoreceptor drums contacts with the intermediate transfer belt in the multi-color mode.

11. A tandem-type color image forming apparatus as claimed in claim 10, wherein the photoreceptor drums transfer their images to the intermediate transfer belt as a primary transfer operation and the intermediate transfer belt transfers its image to a sheet of paper as a secondary transfer operation, and wherein the switching operation from the multi-color mode to the mono-color mode is carried out after the secondary transfer operation for a previous image.

12. A tandem-type color image forming apparatus as claimed in claim 10, wherein the photoreceptor drums transfer their images to the intermediate transfer belt as a primary transfer operation and the intermediate transfer belt transfers its image to a sheet of paper as a secondary transfer operation, and wherein the switching operation from the mono-color mode to the multi-color mode is carried out after the primary transfer operation for a previous image.

13. A tandem-type color image forming apparatus, comprising:
   a first image forming unit which forms a first color image;
   a second image forming unit which forms a second color image;
   a mode switching device for switching a color mode between a first color mode in which both of the first and second image forming units are used and a second color mode in which one of the first and second image forming units are used;
   a timer for counting a time period, the time period being a predetermined value; and
   a controller which controls a length of time by use of said timer from the color mode switching operation to a next image forming operation, wherein
   the length of time when the color mode is switched from the first color mode to the second color mode is different from the length of time when the color mode is switched from the second color mode to the first color mode, and
   when a color mode is switched from the first color mode to the second mode while different images are continuously formed, the controller makes the image forming device start the image forming operation at the approximate same time as the start of switching to the second color mode.

14. A tandem-type color image forming apparatus as claimed in claim 13, wherein the apparatus is a printer, a digital copying machine or a multi-functional peripheral device.

15. A tandem-type color image forming apparatus as claimed in claim 13, wherein the controller delays the image forming operation for a predetermined period of time when switching from the second color mode to the first color mode.

16. A tandem-type color image forming apparatus as claimed in claim 13, wherein the second color mode is a monochrome mode.

17. A tandem-type color image forming apparatus as claimed in claim 13, further comprising a intermediate transfer belt, and wherein the first and second image forming units are aligned along the intermediate transfer belt, and wherein both of the first and second image forming units contact with the intermediate transfer belt in the first color mode and one of the first and second image forming units contacts with the intermediate transfer belt in the second color mode.

* * * * *